United States Patent
Turicchi, Jr. et al.

(10) Patent No.: US 8,635,484 B2
(45) Date of Patent: Jan. 21, 2014

(54) EVENT BASED CORRELATION OF POWER EVENTS

(75) Inventors: Thomas E. Turicchi, Jr., Dallas, TX (US); Charles W Cochran, Spring, TX (US); Darrel G. Gaston, Spring, TX (US); Alan L. Goodrum, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/256,278

(22) PCT Filed: Mar. 18, 2009

(86) PCT No.: PCT/US2009/037465
§ 371 (c)(1),
(2), (4) Date: Sep. 13, 2011

(87) PCT Pub. No.: WO2010/107427
PCT Pub. Date: Sep. 23, 2010

(65) Prior Publication Data
US 2012/0017102 A1    Jan. 19, 2012

(51) Int. Cl.
*G06F 1/00*    (2006.01)

(52) U.S. Cl.
USPC .............................................. 713/340; 702/62

(58) Field of Classification Search
USPC ....................... 713/340, 300, 310; 702/60–62; 700/286, 291, 295, 297
See application file for complete search history.

(56) References Cited

U.S. PATENT DOCUMENTS

| 7,269,753 | B2 | 9/2007 | Farkas et al. | |
| 7,464,207 | B2 * | 12/2008 | Riley et al. | 710/113 |
| 2006/0044117 | A1 * | 3/2006 | Farkas et al. | 340/310.11 |
| 2008/0244281 | A1 | 10/2008 | Felter et al. | |
| 2008/0317021 | A1 | 12/2008 | Ives et al. | |

FOREIGN PATENT DOCUMENTS

JP    2003348771    5/2003

* cited by examiner

*Primary Examiner* — Clifford Knoll

(57) ABSTRACT

Systems, methods, and other embodiments associated with event based correlation of power events are described. One example method includes storing a power distribution unit (PDU) event data that identifies an occurrence of a suspected power event associated with a device. The method can then provide a PDU-server correlation signal that identifies a connection between a PDU and a device.

15 Claims, 7 Drawing Sheets

EVENT BASED CORRELATION OF POWER EVENTS

CROSS REFERENCE TO RELATED APPLICATIONS

This application is related to the following patent application, which is assigned to the present assignee: POWER DISTRIBUTION UNIT-DEVICE CORRELATION, inventors: Thomas Turicchi Jr., Clifford A. McCarthy, Charles W. Cochran, and assigned, PCT patent application Ser. No. PCT/US2009/038190, filed on Mar. 25, 2009.

BACKGROUND

In a power distribution network, devices are powered by one or more other devices. For example in a computer datacenter, a power distribution unit (PDU) can be used to provide electricity to one or more servers. Conventionally it has been difficult, if even possible, to identify which servers are powered by which PDUs, which PDUs are powered by which power panels (PPs), which PPs are powered by which feeds, and so on. Having an understanding of a power distribution network topology in, for example, a datacenter, is useful for troubleshooting power problems, managing capacity, configuring group power capping, verifying redundancy, facilitating high availability, and so on.

Conventionally, electricity and/or power distribution systems for networks have been mapped by hand to create a network power topology map. However, due to the time needed to hand-map a power network topology and the need to constantly update the power network topology map when new components are added and/or when existing components are relocated, power network topology mapping is time intensive and difficult to maintain. A technician may manually trace wires from source to destination (e.g., from the feeds 210 to an individual server), or vice versa. The topology of the network may be manually recorded. However, this is a time consuming and error prone process that often produces an inaccurate and/or incomplete network power topology.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
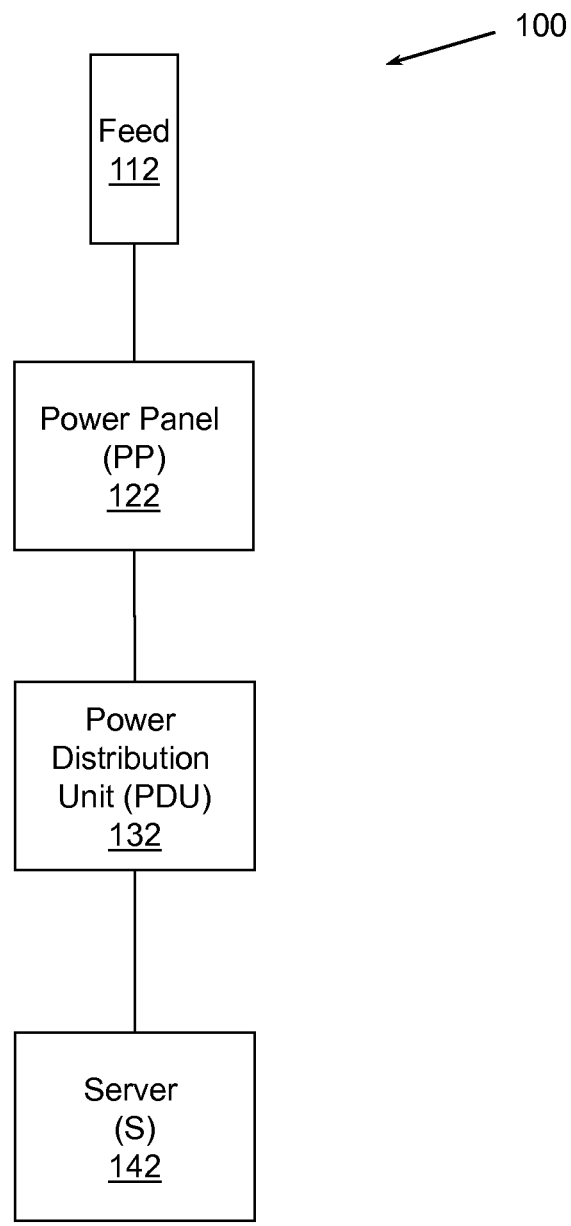
FIG. 1 illustrates an example power distribution network in a datacenter.
Figure 2:
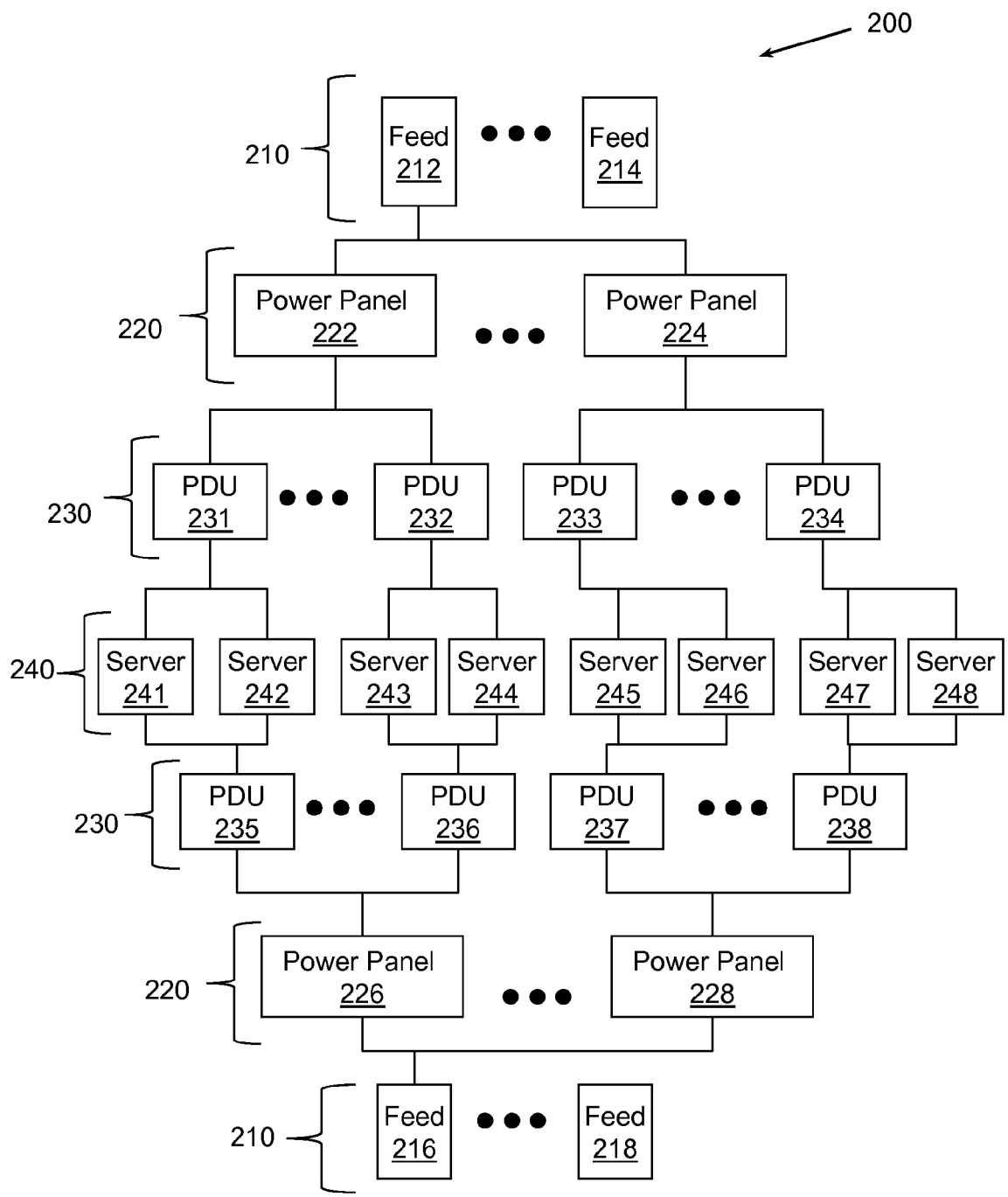
FIG. 2 illustrates a more complicated example power distribution network in a datacenter.

Before considering the embodiments discussed herein in greater detail, first consider the following examples. FIG. one illustrates a simple power distribution network 100 in a datacenter. In this simplest case, a single feed 112 provides electricity to a single power panel (PP) 122 which in turn provides electricity to a single power distribution unit (PDU) 132 which in turn provides electricity to a single server 142. If all power distribution networks were this simple, issues associated with identifying connections between servers, storage devices, networking devices, PDUs, PPs, feeds, and so on would be minimal. However, a power distribution network associated with real world installations (e.g., a datacenter) is rarely, if ever, so simple.

FIG. two illustrates the more general case of a highly interconnected power distribution network 200 in a datacenter. In power distribution network 200, a number of feeds (e.g., 212, 214, . . . 218) collectively referred to as feeds 210, bring electricity into a datacenter. While a datacenter is described, it is to be appreciated that more generally feeds 210 can provide electricity to other related collections of power distribution and power consuming items. It is relatively straightforward to keep track of what feeds are available in a data center because the number of feeds is generally relatively low.

In network 200, the feeds 210 provide electricity to a number of power panels (e.g., 222, 224, . . . 228) that are collectively referred to as PPs 220. In different examples, a single feed may be connected to one or more power panels. Once again the number of power panels 220 may be relatively low and it may not be that difficult to track the power panels. However, even with a small number of feeds and a small number of power panels, there can be a large and sometimes confusing set of connections between feeds and power panels.

In topology 200, the power panels 220 may provide electricity to a number of PDUs (e.g., 231, 232, . . . 238) that are collectively referred to as PDUs 230. Once again, a single power panel may be connected to a number of PDUs. Additionally there may be a relatively large number of PDUs. Therefore, there can be a large and confusing number of connections between power panels and PDUs.

In power distribution network 200, the PDUs 230 may provide electricity to a number of servers (e.g., 241, 242, . . . 248) that are collectively referred to as servers 240. A 3 phase PDU may distribute power as a 3 phase set of single phase outlets to blade enclosures, storage arrays, or network chassis or discrete single phase outlets per server, storage device or network device. The server, storage device, or network device may be referred to generically as a device. The load phases are managed in order to maintain phase load balancing. Once again, a single PDU may be connected to a number of servers and a server may be connected to one or more PDUs. Similarly, a single PDU may be connected to a number of devices and a device may be connected to one or more PDUs. This can lead to a very large and potentially very confusing set of connections between PDUs and servers or more generally between PDUs and devices. Additionally, servers and devices may tend to be relocated, which may cause an initial "map" of a power topology to quickly get out of date. Yet knowing which PDUs are providing power to which servers can be important to maintaining high availability in a data center. One skilled in the art will appreciate that while a single layer of servers 240 is illustrated, that multiple layers of servers, of PDUs, of power panels, and so on, may be present in a power distribution topology.

It is difficult to identify which servers are powered by which PDUs, which PDUs are powered by which PPs, which PPs are powered by which feeds, and so on. Conventional tools do not include automated means to discover a power network topology. Yet having an understanding of a power distribution network topology in, for example, a datacenter, is useful for troubleshooting power problems, managing capacity, configuring group power capping, verifying redundancy, facilitating high availability, and so on.

Example systems and methods described herein can be use to automatically discover a portion of datacenter power distribution network topology. The portion may be, for example, a connection between a server and a PDU, between a networking device and a PDU, between a storage device and a PDU, and so on. Example systems and methods may correlate events reported by servers with events reported by PDUs. More generally, example systems and methods may correlate events reported by devices with events reported by PDUs. For example, a server may report that it performed a ROMBURN, that it performed an identifiable power-on event, that it exercised its CPU using a short duration high load process, and so on. A ROMBURN is described in greater detail below. These types of events will be referred to herein collectively as identifiable server power events. The server may store data concerning the event locally and/or may report the event to a remote apparatus and/or process. For example, the server may report the event to a central management server (CMS).

Similarly, a PDU may report that while monitoring electrical usage characteristics of a server (e.g., power consumption) that an identifiable server power event was detected. With the report from the server available, and with the report from the PDU available, a correlation process can match server events to PDU events and determine that a connection exists between a server and a PDU.

Thus, example systems and methods may detect events that can be correlated and then perform event based correlation to identify connections between servers and PDUs. The events that can be correlated may have a duration of, for example, five to ten seconds. Note that the server need not monitor its power usage or other electrical characteristics so long as it can report the fact of an identifiable event. The PDU may need to monitor what it is providing to be able to report that a suspected identifiable event occurred.

PDUs distribute power in a datacenter to a group of computing and/or networking equipment. A PDU may provide power to, for example, 4, 8, 16, or more devices. A PDU may monitor the amount of power it draws from upstream in the power delivery network. A PDU may also monitor the amount of current drawn from the PDU by consuming devices downstream in the power delivery network. The monitoring may include recording device identity, device capacity, actual measurement data, a time at which the actual measurement data was recorded, and so on. Example systems and methods may be able to correlate a particular PDU power consumption event to an identifiable server power event. In one example, a PDU may monitor an aggregate of the current drawn from the PDU. In another example, a PDU may monitor current drawn on a per port basis (e.g., per outlet basis). The monitoring may result in data being provided to a correlation logic, to a data store, and so on. The correlation logic may compare the power and/or current recorded at the PDU and compare it to server power event reports to determine whether a server is connected to the PDU.

Server ROMBURNs are events that have a known and controllable power consumption characteristic. A server ROMBURN may be associated with a server power-on and/or reboot event. A ROMBURN is a predictable event that utilizes a certain amount of CPU power, and so on, at specific time intervals after the start of the event. ROMBURNs may generate a large step function in the power used by the server. Power consumption during a ROMBURN may be consistent from event to event. This power consumption may be recognizable by a PDU providing power to a server that performed a ROMBURN. When a server reports that it performed a ROMBURN, the server may report device identity, device capacity, actual measurement data (e.g., CPU usage), a time at which the actual measurement data was recorded, a time at which the ROMBURN commenced, and so on. In one minimal embodiment, a server may simply report the fact that it performed a ROMBURN event and the time at which it performed the ROMBURN event. While a ROMBURN event is described, more generally a server may report when it performed an identifiable server power event.

In one embodiment, an identifiable server power event is performed at a controlled and knowable time. For example, an integrated lights out (iLO) device may send a signal to the server to initiate an identifiable server power event (e.g., ROMBURN). Additionally, the iLO device may control the identifiable server power event to occur multiple times at known intervals to create a unique sequence of power load cycles. An individual event and/or a unique sequence of events may facilitate creating a detectable signature for a particular server. A correlation system may correlate the unique sequence of power load cycles from the identifiable server power event(s) to determine that a server is connected to a PDU. More generally, an identifiable power event may be detected and more generally determinations identifying a device being connected to a PDU may be made.

A ROMBURN may run a server close to or at the point of maximum power draw. However, the ROMBURN may also include idle and intermediate power consumption levels. The ROMBURN may even be configured to have a unique power consumption pattern (e.g., step function) compared to common server increases in workload. These attributes make a ROMBURN and/or other identifiable server power event identifiable to a PDU. ROMBURN events for multiple servers may occur together when, for example, a server rack including multiple servers is powered on. It may be difficult or impossible to correlate multiple nearly simultaneous ROMBURN events to server events detected at multiple PDUs. However, a list of possible correlations may be created and maintained based on this data. The list of possible correlations may be used later to correlate particular servers with particular PDUs based on future ROMBURN events. For example, when there are several candidates for a connection between a server and a PDU, the server may later be controlled to perform an identifiable server power event.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
CPU: central processing unit.
DVD: digital versatile disk and/or digital video disk.
HTTP: hypertext transfer protocol.
iLO: integrated lights out.
LAN: local area network.
PCI: peripheral component interconnect.
PCIE: PCI express.
RAM: random access memory.
DRAM: dynamic RAM.
SRAM: static RAM.
ROM: read only memory.
PROM: programmable ROM.
USB: universal serial bus.
WAN: wide area network.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
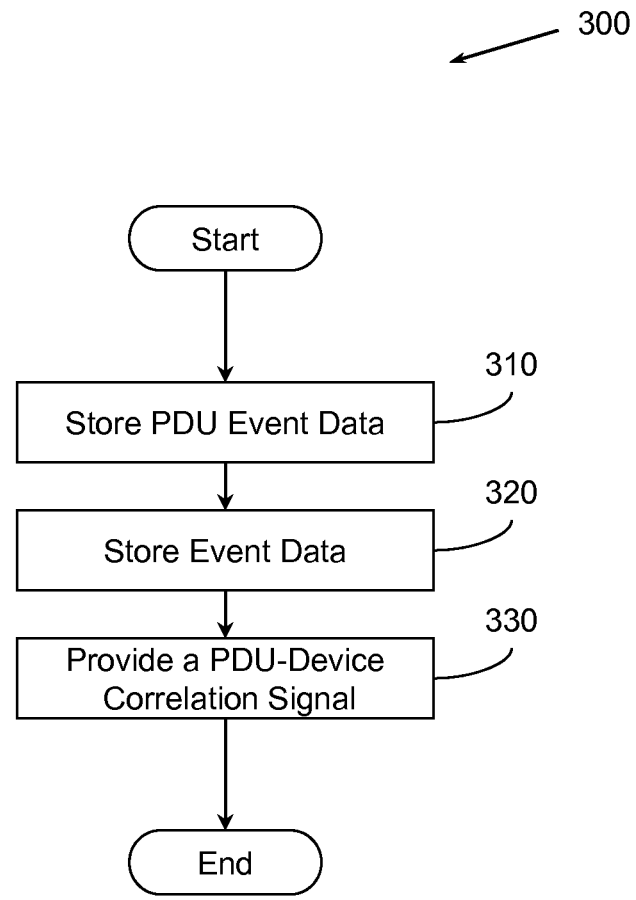
FIG. 3 illustrates an example method associated with event based correlation of power event indicia for discovery of a portion of a power network topology.

FIG. 3 illustrates a method 300 associated with event based correlation of power event indicia for discovery of a portion of a power network topology. Method 300 may include, at 310, storing PDU event data. The PDU event data may identify, on a per power distribution unit (PDU) basis, the suspected and/or detected occurrence of an identifiable power event based, for example, on power drawn from the PDU. In one embodiment, the PDU event data may identify a level of current drawn on a per-PDU per-outlet basis.

Method 300 may also include, at 320, storing device event data. The device event data may identify, on a per device (e.g., server, networking device, storage device) basis, the occurrence of an identifiable power event (e.g., ROMBURN, power-on, recognizable short duration load pattern). Recall that a ROMBURN is a computationally intensive program designed to control a device to, for example, draw a near maximum amount of power. The ROMBURN may be associated with a device boot and/or device power-on. In one embodiment, the ROMBURN may create a power step function that consumes varying amounts of power. Thus, not only can a PDU report that a suspected power event occurred, but a PDU could also report that a particular suspected power event occurred. This may facilitate disambiguating correlations when two or more devices experience a power on event at nearly the same time.

Method 300 may also include, at 330, providing a PDU-device correlation signal. The PDU-device correlation signal provided at 330 may identify a correlation between a suspected power event detected by a PDU and an actual power event experienced at a device (e.g., server). In one embodiment, the PDU-device correlation signal identifies a correlation between current drawn from an outlet on a member of the set of related PDUs and power used by a member of the set of related devices during a power-on event.

While FIG. 3 illustrates various actions occurring in serial, it is to be appreciated that various actions illustrated in FIG. 3 could occur substantially in parallel. By way of illustration, a first process could store PDU event data at 310, a second process could store device event data at 320, and a third process could provide a PDU-device correlation signal at 330. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes storing PDU event data that identifies an occurrence of a suspected server power event. The PDU event data identifies a PDU that detected the suspected server power event and a PDU time at which the PDU detected the suspected server power event. The method also includes storing server event data that identifies an occurrence of an actual server power event. The server event data identifies a server that experienced the actual server power event and a server time at which the server performed the actual server power event. The method also includes providing a PDU-server correlation signal that identifies a connection between a PDU and a server. The correlation is made as a function of correlating a suspected server power event and an actual server power event based on the PDU event data and the server event data. While executable instructions associated with the above method are described as being stored on a computer-readable medium, it is to be appreciated that executable instructions associated with other example methods described herein may also be stored on a computer-readable medium.

Figure 4:
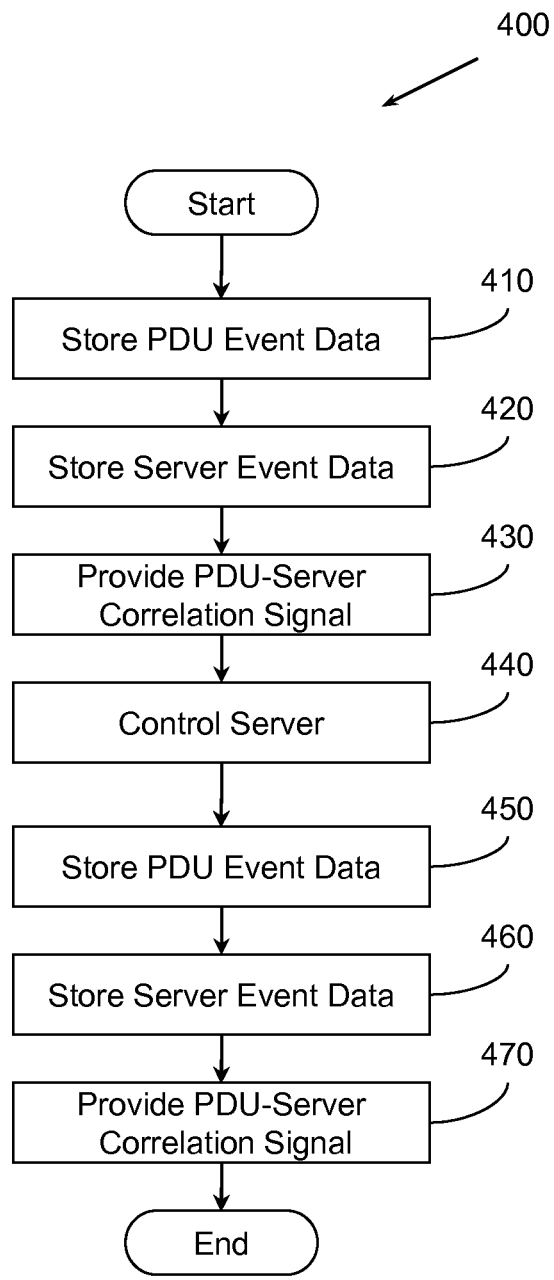
FIG. 4 illustrates another example method associated with event based correlation of power event indicia for discovery of a portion of a power network topology.

FIG. 4 illustrates a method 400 associated with event based correlation of power event indicia for discovery of a portion of a power network topology. Method 400 may include actions similar to method 300 of FIG. 3. These actions may include storing a PDU event data at 410, storing a server event data at 420, and providing a PDU-server correlation signal at 430. While method 400 is directed at servers, one skilled in the art will appreciate that more generally method 400 can be directed at devices.

Method 400 may also include other actions. For example, method 400 may also include, at 440, controlling a server. The server may be controlled by, for example, an integrated lights out (iLO) process. The iLO process may send an event to a server to initiate an identifiable server power event (e.g., ROMBURN). Additionally, the iLO process may send an event executed signal to a central management server (CMS) to identify a time when the event was executed. The CMS may store information related to power-on events, current usage statistics, power usage statistics, power frequency statistics, and so on. The CMS may provide information to a correlation logic that facilitates identification of whether a particular server is attached to a particular power system (e.g., PDU).

An iLO may be an intelligent remote management processor integrated in a server to provide information technology (IT) professionals with a virtual presence. The IT professional may have complete control of the server from a remote site(s) that is similar to being at the server. iLO features may include simplified setup, group configuration, remote power-on/off, Secure Socket Layer (SSL) security, detailed server status, virtual indicators, and diagnostics, in addition to system reboot capability.

In one embodiment, the iLO commands a server to reboot, to perform an exercise, and so on. Additionally, the ILO may control two or more servers to perform identifiable server power events in a particular sequence. Additionally, the iLO may control a server to perform identifiable power events multiple times at specified intervals to create a unique power consumption pattern.

In one embodiment, the iLO controls the member of the set of related servers to cycle power in an identifiable pattern. The identifiable pattern may include an identifiable current usage pattern, an identifiable power usage pattern, identifiable power factor differences between current usage and voltage usage, and so on.

A server or other device may have one, two, or even more power supplies. Different power supplies may be connected to different PDUs. Therefore, in one embodiment, a process (e.g., iLO) and/or apparatus may control a server to turn a power supply on and/or off. Thus, an additional identifiable event (e.g., power off) may occur at a known time and therefore be able to be correlated to activity reported by a PDU. This power supply control may be employed, for example, in a blade enclosure environment. Instead of, and/or in addition to identifying server to PDU connections based on ROMBURN events, in a blade enclosure environment, power supplies may be turned on and/or off to provide the identifiable server event that can be correlated to the PDU event.

Therefore, method 400 includes, at 440, controlling a server. The server may be controlled to power off a power supply, to power on a power supply, to perform a ROMBURN event, to perform another identifiable server power event, and so on. The server may be selectively controlled upon determining, for example, that there are two or more potential PDU to server connections that need to be disambiguated.

After the control at 440, additional PDU events and server events may be available. Therefore method 400 includes, at 450, storing PDU event data, and, at 460, storing server event data. A PDU-server correlation signal may be provided at 470 in response to the additional events stored at 450 and 460.

Figure 5:
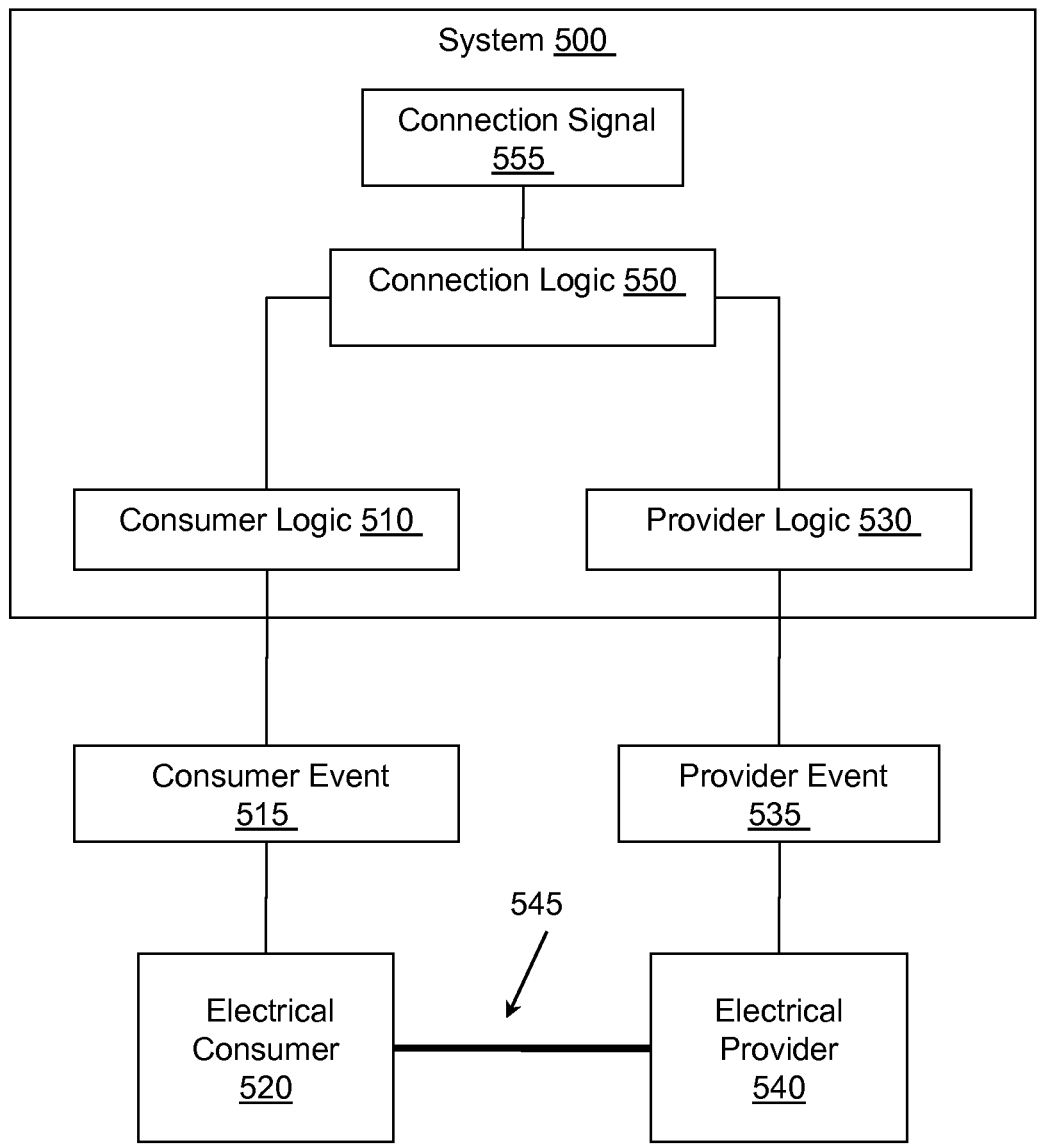
FIG. 5 illustrates an example system associated with event based correlation of power event indicia for discovery of a portion of a power network topology.

FIG. 5 illustrates a system 500 associated with event based correlation of power event indicia for discovery of a portion of a power network topology. The portion discovered may be a connection between a server and a PDU. More generally the portion discovered may be a connection between a consumer and a provider. Since a server or consumer may have multiple power supplies, and since each power supply may be connected to a different PDU, the portion discovered may be a connection between a power supply and a PDU. This facilitates determining whether a server with multiple power supplies has redundant connections to different PDUs.

System 500 includes a consumer logic 510 to identify that an identifiable consumer power event occurred. The identifiable consumer power event may be, for example, a CPU driven power stress test. The identifiable event may be associated with a power up sequence for the electrical consumer 520. The identifiable event may be initiated by an iLO, by a server (e.g., reboot due to server error), by a user, and so on. A consumer event 515 may be reported by the consumer logic 510 to the connection logic 550. While the consumer logic 510 is illustrated separate from consumer 520, it is to be appreciated that the consumer logic 510 may reside inside the consumer 520, may be a part of the consumer 520, and so on.

Because the identifiable event may be initiated a number of different ways, the consumer event 515 may be reported to the connection logic 550 in different ways. In one example, the consumer event 515 may be reported by the consumer logic 510. In another example, the consumer event 515 may be reported by the consumer 520. In yet another example, when the consumer 520 is controlled to perform the event, the consumer event 515 may be reported by the entity (e.g., iLO) controlling the consumer 520 to perform the event. The consumer event may be, for example, a ROMBURN.

In one example, the consumer event 515 will store the time at which the identifiable event occurred and some identifier of the consumer 520 that experienced the event. In another example, the consumer event 515 may store a consumption information regarding current, power, power factor, and so on. The consumption information may be related to the energy consumption characteristics of the electrical consumer 520 during the identifiable consumer power event (e.g., ROMBURN). While example systems and methods generally perform event based correlation, storing the consumption information associated with the identifiable consumer power event performed by the consumer 520 may facilitate, for example, training PDUs to recognize events, evaluating how accurately PDUs are recognizing events, disambiguating multiple simultaneous events, and so on.

System 500 may also include a provider logic 530 to determine that an identifiable power event occurred. The provider logic 530 may have been configured, programmed, and/or trained to recognize a provider event 535. Since the provider 540 provides electricity to the consumer 520 over connection 545, the provider event 535 may correspond to an identifiable consumer power event occurring on the consumer 520. Rather than hand mapping that connection 545 exists, correlating the consumer event 515 and the provider event 535 facilitates automatically discovering that consumer 520 is in fact receiving electricity from provider 540 and that connection 545 exists.

In one embodiment, the electrical provider 540 is a power distribution unit (PDU) in the datacenter. In one embodiment, the provider event 535 simply reports that a suspected power event occurred on a particular PDU at a particular time. In another embodiment, the provider event 535 also stores electrical usage characteristic data including, for example, power factor, current, power, and so on, associated with the suspected event. While system 500 may perform event based correlation to identify connections in a power topology, having the additional electrical usage characteristic data may facilitate additional analytics and/or disambiguation.

System 500 may also include a connection logic 550 to produce a connection signal 555 that identifies whether a correlation between the consumer event 515 and the provider event 535 identifies the electrical consumer 520 as a consumer of electricity provided by the electrical provider 540. In one embodiment, the connection logic 550 identifies the correlation between the consumer event 515 and the provider event 535 based, at least in part, on data concerning when the events occurred. If the events occurred within a threshold time of each other, then the correlation may be made. In one embodiment, the connection logic 550 produces the connection signal 555 after comparing additional data (e.g., electrical usage characteristic data) associated with the consumer event 515 and the provider event 535.

Figure 6:
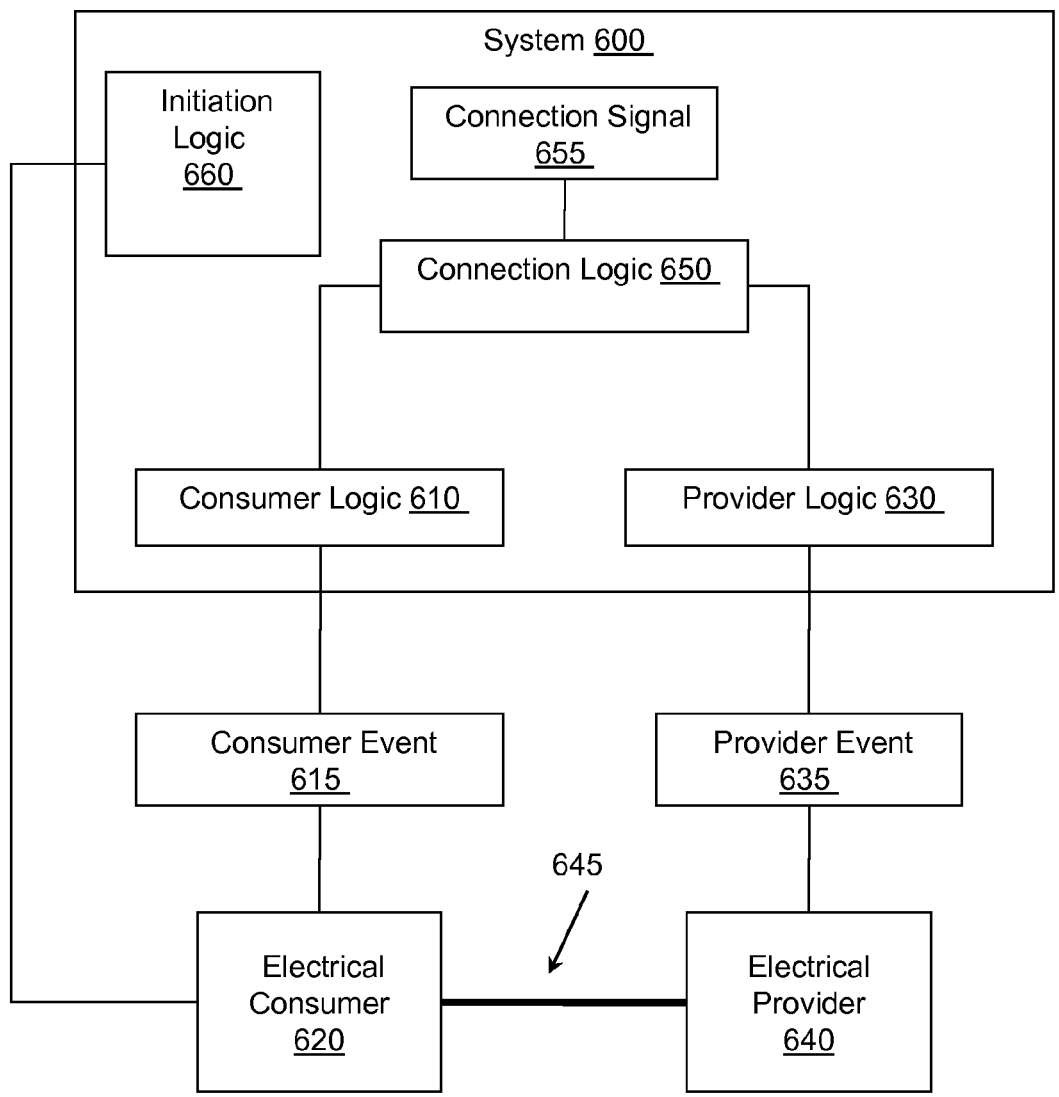
FIG. 6 illustrates an example system associated with event based correlation of power event indicia for discovery of a portion of a power network topology.

FIG. 6 illustrates a system 600 associated with event based correlation of power event indicia for discovery of a portion of a power network topology. System 600 includes many elements similar to those described in connection with system 500 (FIG. 5). For example, system 600 includes a consumer logic 610, a provider logic 630, and a connection logic 650. Consumer logic 610 processes consumer events 615 associated with a consumer 620, provider logic 630 processes provider events 635 associated with a provider 640 and connection logic 650 produces a connection signal 655.

System 600 also includes an initiation logic 660. Initiation logic 660 is configured to initiate the identifiable event (e.g., ROMBURN, power down, power up) in the electrical consumer 620. In one example, initiation logic 660 may initiate events in different servers at different known times to facilitate disambiguating events that could not initially be completely correlated. For example, two servers may have performed ROMBURNs at nearly the same time. Two PDUs may have reported the two events. Thus, it may not be possible to determine which server is connected to which PDU from just the initial data. Therefore initiation logic 660 may control one of the two servers to perform an identifiable event and then may control the other of the two servers to also perform an identifiable event at a later time. The two PDUs may still identify two identifiable consumer events, however the two events may be separated by a period of time that facilitates disambiguating one from the other.

Initiation logic 660 may also control servers that have two or more power supplies to power down and power up those power supplies to facilitate identifying whether a server has redundant connections to PDUs. When a server has two power supplies it often times makes sense to connect those two power supplies to two different PDUs. Manually ensuring that this is the case can be time consuming and difficult, especially as servers are relocated in, for example, a blade enclosure. Phase topology can also be detected to manage phase load balancing in the data center, identify loads to redistribute to other load phases to maintain correct phase load balance, or provide data to phase load correcting algorithm in a 3 phase power supply system. Therefore initiation logic 660 may be configured to control a server to power down one power supply. This may cause a PDU to notice that a load on an outlet dropped to zero. Initiation logic 660 may then control the server to power up that power supply. This should in turn cause the PDU to notice that a load was reintroduced on the outlet. The initiation logic 660 may then control the server to power down and power up another power supply in the server. One skilled in the art will appreciate that this process may be repeated for multiple power supplies in multiple servers, storage devices, network devices, or other any manageable 3 phase power devices. The power down power up protocol is an identifiable power usage event that may be reported on at least one of the PDUs. This may provide information concerning which power supply is providing power to the server at a given point in time.

Figure 7:
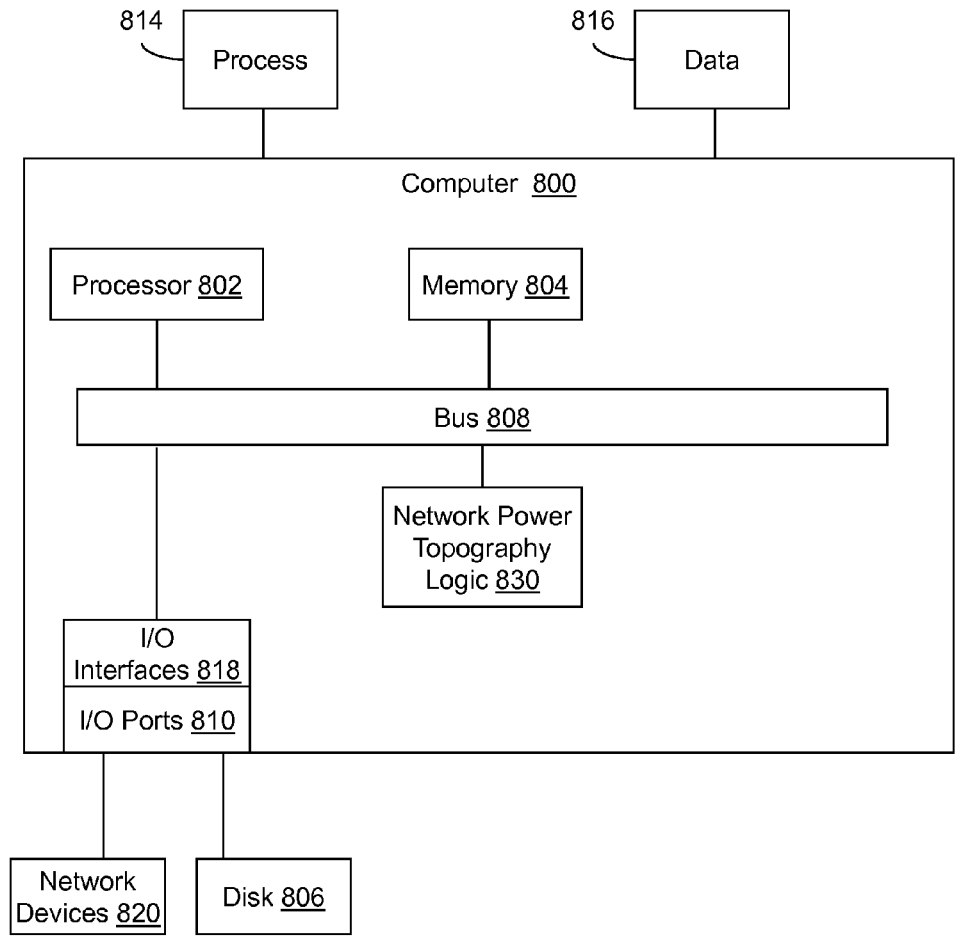
FIG. 7 illustrates an example computing environment in which example systems and methods, and equivalents, may operate.

FIG. 7 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a network power topography logic 830 configured to facilitate discovery of a power network topography using event based correlation. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for detecting a consumer event (e.g., ROM-BURN). The consumer may be a member of a set of related resource consumers (e.g., servers) that generate an identifiable power-on signature or other CPU driven power stress signature. The means may be implemented, for example, as an ASIC programmed to facilitate discovery of a power network topography using identifiable device (e.g., server) power events. The means may also be implemented as computer executable instructions that are presented to computer 800 as data 816 that are temporarily stored in memory 804 and then executed by processor 802.

Logic 830 may provide means (e.g., hardware, software, firmware) for detecting a provider (e.g., PDU) event. The resource provider may be a member of a set of related resource providers. Logic 830 may provide means (e.g., hardware, software, firmware) for determining whether the consumer is connected to the provider by comparing events reported by the consumer and provider.

Generally describing an example configuration of the computer 800, the processor 802 may be one of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable medium storing computer-executable instructions that when executed by a computer control the computer to perform a method, the method comprising:
  storing a power distribution unit (PDU) event data that identifies an occurrence of a suspected power event associated with a device, the device being one of, a server, a storage device, and a network device, where the PDU event data identifies a PDU that detected the suspected power event and a PDU time at which the PDU detected the suspected power event;
  reporting a device event data, with the device, that includes a type of an actual power event occurring with the device, where the device event data identifies the device that experienced the actual power event and a device time at which the device performed the actual power event; and
  providing a PDU-server correlation signal that identifies a connection between a PDU and the device by one or more of, power load phase, and panel breaker pole as a function of correlating the suspected power event and the actual power event based on the PDU event data and the device event data.

2. The computer-readable medium of claim 1, comprising identifying an occurrence of a suspected power event by comparing a PDU electrical usage pattern to an event signature.

3. The computer-readable medium of claim 1,
where the PDU event data comprises a PDU identifier, a PDU electrical usage characteristic, and a PDU time stamp, and
where the device event data comprises a device identifier, a device electrical usage characteristic, and a device time stamp.

4. The computer-readable medium of claim 3, where the PDU electrical usage characteristic describes one or more of, a PDU current capacity, a PDU current measurement, a PDU power capacity, a PDU power measurement, and a PDU power factor measurement.

5. The computer-readable medium of claim 3, where the device electrical usage characteristic describes one or more of, a device maximum power consumption, a device power consumption, and a device CPU utilization measurement.

6. The computer-readable medium of claim 1, where the correlation between the suspected power event and the actual power event depends on comparing times at which the suspected power event and the actual power event occurred.

7. The computer-readable medium of claim 6, where the correlation between the suspected power event and the actual power event also depends on comparing one or more PDU electrical usage characteristics to one or more device electrical usage characteristics.

8. The computer-readable medium of claim 1, the method comprising:
controlling the device to experience a power event.

9. The computer-readable medium of claim 8, where controlling the device to experience a power event comprises controlling the device to perform a computationally intensive program designed to control the device to draw a specific amount of power at a specific interval to create a unique power consumption pattern.

10. The computer-readable medium of claim 1, where the actual power event is associated with a program stored in a read only memory in the device and is executed when the device is booted.

11. The computer-readable medium of claim 1, comprising:
identifying redundant power connections for a device having two or more power supplies.

12. The computer-readable medium of claim 11, where identifying redundant power connections includes one or more of, controlling the device to selectively power down a power supply, and controlling the device to selectively power up a power supply.

13. A system, comprising:
a consumer logic configured to identify a type of a consumer power event at an electrical consumer;
a provider logic configured to identify a provider power event at an electrical provider; and
a connection logic configured to produce a connection signal that identifies whether a correlation between the type of the consumer power event and the provider power event identifies the electrical consumer as a consumer of electricity provided by the electrical provider.

14. The system of claim 13, comprising:
an initiation logic to control the electrical consumer to consume power in a recognizable pattern at a known time.

15. A system, comprising:
means for producing a consumer report that a resource consumer experienced a type of an identifiable power usage event, where the resource consumer is a member of a set of related resource consumers;
means for producing a provider report that a resource provider identified that a resource consumer experienced an identifiable power usage event, where the resource provider is a member of a set of related resource providers; and
means for identifying a power distribution topography based, at least in part, on correlating the type of the identifiable power usage event reported in the consumer report and the identifiable power usage event reported in the provider report.

* * * * *